US008724595B2

(12) United States Patent
Rousu et al.

(10) Patent No.: US 8,724,595 B2
(45) Date of Patent: May 13, 2014

(54) TERMINAL-ASSISTED IMPROVEMENT OF TIMING-BASED POSITIONING ACCURACY

(75) Inventors: Seppo Rousu, Oulu (FI); Antti Immonen, Helsinki (FI)

(73) Assignee: Broadcom Corporation, Irvine, CA (US)

( * ) Notice: Subject to any disclaimer, the term of this patent is extended or adjusted under 35 U.S.C. 154(b) by 129 days.

(21) Appl. No.: 13/336,194

(22) Filed: Dec. 23, 2011

(65) Prior Publication Data

US 2013/0163451 A1 Jun. 27, 2013

(30) Foreign Application Priority Data

Dec. 22, 2011 (GB) .................................. 1122103.3

(51) Int. Cl.
*H04W 4/00* (2009.01)

(52) U.S. Cl.
USPC ........... 370/332; 370/335; 370/342; 370/519; 370/349

(58) Field of Classification Search
USPC ......... 370/329, 252, 335, 342, 332, 310, 349, 370/519
See application file for complete search history.

(56) References Cited

U.S. PATENT DOCUMENTS 6,529,165 B1 3/2003 Duffett-Smith et al.
7,755,544 B2 * 7/2010 Kawakami et al. ...... 342/357.23
7,898,473 B2 * 3/2011 Sairo et al. ............... 342/357.43
8,094,067 B2 * 1/2012 Malkos et al. ........... 342/357.42
8,213,957 B2 * 7/2012 Bull et al. .................. 455/456.1
8,244,174 B1 * 8/2012 Kong ............................. 455/25
8,244,349 B2 * 8/2012 Sanghera et al. ................. 607/5
8,259,010 B2 * 9/2012 Ische et al. ............... 342/357.43
8,447,327 B2 * 5/2013 Escolar-Piedras et al. 455/456.1
2004/0023671 A1 2/2004 Rudolf et al.
2004/0044911 A1 * 3/2004 Takada et al. ................. 713/201
2009/0149202 A1 6/2009 Hill et al. ................... 455/456.6
2011/0141909 A1 6/2011 Hibara et al.
2011/0275385 A1 11/2011 Escolar-Piedras et al.
2011/0285585 A1 11/2011 Bergamo ................ 342/357.31

FOREIGN PATENT DOCUMENTS

EP 1229343 A1 8/2002
GB 2366490 A 3/2002

OTHER PUBLICATIONS

Ranta-Aho, K., "Performance of 3GPP Rel-9 LTE Positioning Methods", Jun. 13-14, 2010, 2nd Invitational Workshop on Opportunistic RF Localization for Next Generation Wireless Devices, Nokia Siemens Networks, 5 pgs.

TSG RAN WG 1: 'LS on assistance information for OTDOA positioning support for LTE' 3GPP Draft; RI-093729 LS on Assistance Information, 3rd Generation Partnership Project (3GPP), vol. RAN WGI, No. Shenzhen, China; 20090824-20090828, Aug. 28, 2009, XP050597706, table 2.

* cited by examiner

*Primary Examiner* — Ricky Ngo
*Assistant Examiner* — Dewanda Samuel
(74) *Attorney, Agent, or Firm* — Stanton IP Law

(57) ABSTRACT

There are provided measures for enabling a terminal-assisted improvement of timing-based positioning accuracy. Such measures may exemplarily include measuring a cell-related timing value for timing-based positioning calculation on the basis of a cell-originated positioning-related signal and measuring a terminal-related timing value for timing-based positioning calculation at an apparatus to be positioned, and utilizing the measured cell-related timing value and the measured terminal-related timing value for timing-based positioning calculation relating to the apparatus to be positioned at a network side.

17 Claims, 8 Drawing Sheets

TERMINAL-ASSISTED IMPROVEMENT OF TIMING-BASED POSITIONING ACCURACY

FIELD OF THE INVENTION

The present invention relates to a terminal-assisted improvement of timing-based positioning accuracy. More specifically, the present invention relates to measures (including methods, apparatuses and computer program products) for enabling a terminal-assisted improvement of timing-based positioning accuracy.

BACKGROUND

In modern and future communication systems, location services and location-based services (LCS) are gaining more attention and importance. In order to enable provision of location services and location-based services for terminals in modern and future communication systems, an accurate positioning of the terminals is vital. An accurate positioning is for example particularly valuable in emergency use cases, under indoor conditions, urban canyons, tunnels, parking halls, subways, vehicles, and the like.

In the framework of 3GPP standardization, LTE control plane signaling support for LCS is introduced from 3GPP Release 9 onwards. Therein, assisted satellite positioning is specified as a primary positioning/localization technique, while both a cell ID based positioning and OTDOA-based positioning are specified as fallback positioning/localization techniques for the event that the terminal lacks satellite positioning capability or the assisted satellite positioning fails e.g. due to non-availability of a required number of positioning satellite signals.

The assisted satellite positioning is essentially based on at least four positioning satellite signals of GPS or any other satellite-based positioning system, while the network can provide assistance data for a reliable fix of the position.

The cell ID based positioning and enhancements thereof are essentially based on the fact that the responsible server (e.g. E-SMLC) knows the geographical locations of the cells, that the timing advance can be used to find a terminal's distance from each base station antenna in the vicinity, and that neighbor cell measurements and the like can be used to increase the accuracy of the positioned. That is to say, the consideration of neighbor cells enhances accuracy of positioning.

The OTDOA-based positioning is essentially based on the measurement of an observed time difference of arrival (OTDOA) on the basis of a positioning-related signal. In this regard, a terminal's position can be multi-laterated (mostly tri-laterated) with the knowledge of multiple (mostly three or more) base stations' transmit timings and their geographical locations and received time differences of at least two other cells relative to the serving cell of the terminal. In this regard, the terminal must detect positioning-related signals from multiple (mostly at least three) base stations in the vicinity.

Generally, when an increased accuracy of positioning results is desired in a specific communication system, the accuracy of positioning of at least one of the positioning/localization techniques specified for that specific communication system is to be improved. In view of the above, in the context of a 3GPP-based LTE communication system, the accuracy of positioning of at least one of assisted satellite positioning, the cell ID based positioning and the OTDOA-based positioning is to be improved.

The accuracy of positioning of the assisted satellite positioning and the cell ID based positioning may not be easily improved without requiring fundamental changes to the functional and/or structural configuration of the underlying satellite-based positioning system and communication system, respectively. Therefore, when an increased accuracy of positioning results is desired in a 3GPP-based LTE communication system, the accuracy of positioning of the OTDOA-based positioning is preferably to be improved.

Generally speaking, the positioning accuracy of a timing-based positioning technique (e.g. the OTDOA-based positioning technique) may typically be improved, while the positioning accuracy of infrastructure-based positioning technique is typically difficult to improve without effecting fundamental modifications to the underlying infrastructure.

Accordingly, in order to increase accuracy of positioning results in a specific communication system, it is desirable to improve the positioning accuracy of a timing-based positioning technique therein, which may typically be achieved when improving underlying timing information and/or timing measurements.

Thus, there is a desire to improve timing-based positioning accuracy.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising measuring a cell-related timing value for timing-based positioning calculation on the basis of a cell-originated positioning-related signal, measuring a terminal-related timing value for timing-based positioning calculation, and signaling the measured cell-related timing value and the measured terminal-related timing value towards a network side for timing-based positioning calculation.

According to an exemplary aspect of the present invention, there is provided a method comprising receiving a cell-related timing value and a terminal-related timing value for timing-based positioning calculation from an apparatus to be positioned, and performing timing-based positioning calculation relating to the apparatus to be positioned on the basis of the received cell-related and terminal-related timing values.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: measuring a cell-related timing value for timing-based positioning calculation on the basis of a cell-originated positioning-related signal, measuring a terminal-related timing value for timing-based positioning calculation, and signaling the measured cell-related timing value and the measured terminal-related timing value towards a network side for timing-based positioning calculation.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: receiving a cell-related timing value and a terminal-related timing value for timing-based positioning calculation from an apparatus to be positioned, and performing timing-based positioning calculation relating to the apparatus to be positioned on the basis of the received cell-related and terminal-related timing values.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the following.

By way of exemplary embodiments of the present invention, there is provided a terminal-assisted improvement of timing-based positioning accuracy (in/for cellular communication systems). More specifically, by way of exemplary embodiments of the present invention, there are provided measures and mechanisms for enabling a terminal-assisted improvement of timing-based positioning accuracy (in/for cellular communication systems).

Thus, enhancements are achieved by methods, apparatuses and computer program products enabling a terminal-assisted improvement of timing-based positioning accuracy (in/for cellular communication systems).

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for enabling a terminal-assisted improvement of timing-based positioning accuracy (in/for cellular communication systems).

In the following, exemplary embodiments of the present invention are described with reference to methods, procedures and functions, as well as with reference to structural arrangements and configurations.

More specifically, without restricting generality, the present invention and exemplary embodiments thereof are described with reference to an exemplary case of OTDOA-based positioning in a 3GPP-based LTE communication system. However, the present invention and exemplary embodiments thereof are equally applicable in/for any communication system or technology (including a downlink satellite communication system, a downlink/uplink satellite communication system, a short range communication system, a cellular communication system) utilizing any timing-based positioning or localization technique.

Figure 1:
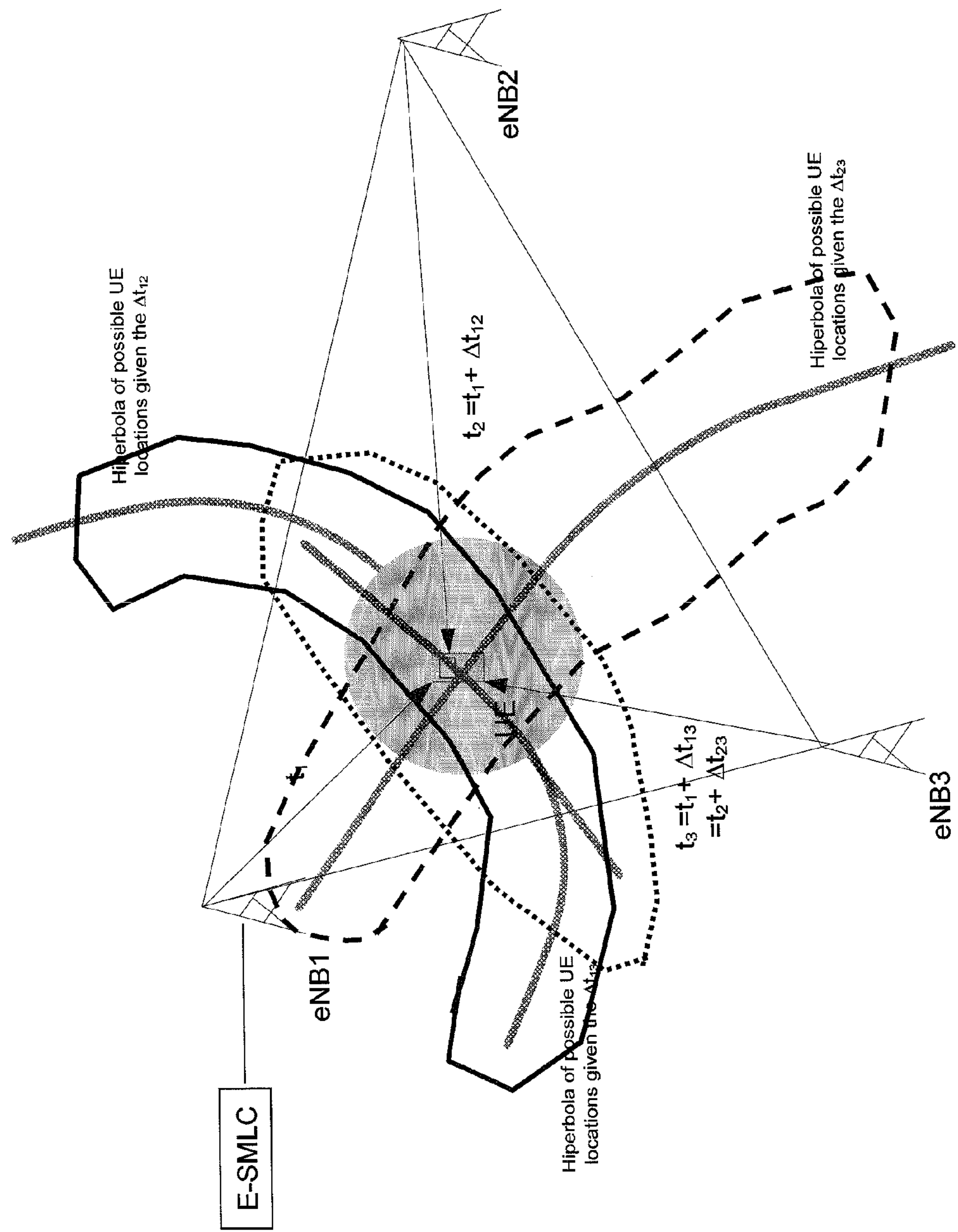
FIG. 1 shows a schematic diagram illustrating a system scenario of a timing-based positioning technique, for which exemplary embodiments of the present invention are applicable.

FIG. 1 shows a schematic diagram illustrating a system scenario of a timing-based positioning technique, for which exemplary embodiments of the present invention are applicable.

In the exemplary scenario according to FIG. 1, it is assumed that a terminal UE is to be positioned or localized using the OTDOA-based positioning with respect to three base stations or access nodes eNB1, eNB2, eNB3 serving cells of the underlying cellular communication system. For example, eNB1 may be assumed to be the base station or access node of the cell currently serving the UE, which may be used as a reference for OTDOA measurements. The base stations or access nodes respectively transmit positioning-related signals, such as PRS signals in the DL direction. The timing values $t_1$, $t_2$, $t_3$ respectively relating to the individual base stations or access nodes eNB1, eNB2, eNB3, which are used for OTDOA-based positioning, are measured at the UE on the basis of the received positioning-related signals, and they are shown in their mutual relationship in FIG. 1.

In the OTDOA-based positioning according to FIG. 1, required neighbor cell information are provided from a network entity, such as an E-SMLC, to the UE via the serving base station or access node, such as eNB1 in FIG. 1. The UE measures the OTDOA timing values of each neighboring cell relative to the serving cell based on such neighbor cell information, and provides the measured OTDOA timing values to the server for triangulating the UE position based thereon. The server then calculates the UE position on the basis of the thus provided OTDOA timing values of the neighbor cells and the local knowledge of real cell positions and transmit timings.

In an ideal case, the calculation of the UE position would yield a single point which is a crossing point of three hyperbolas of possible UE positions with respect to any one of the three base stations or access nodes, as depicted by solid lines in FIG. 1. Due to inaccuracies in measurements, variations in radio path conditions or radio propagation paths and the like, in a real/practical case, the calculation of the UE position typically yields an area (probability region) as an intersection of areas (probability regions) around the three hyperbolas of possible UE positions with respect to any one of the three base stations or access nodes, as depicted by forms with solid, dashed an dotted boundary lines in FIG. 1. Accordingly, the practically probable position of the UE corresponds to the grey circle in FIG. 1. In real/practical cases, the resulting area (probability region) for a UE position, i.e. the area of the grey circle in FIG. 1, may be very wide.

In view of the above findings, exemplary embodiments of the present invention teach to take into account additional timing information and/or timing measurements for improving timing-based positioning accuracy in a terminal-assisted manner.

Figure 2A:
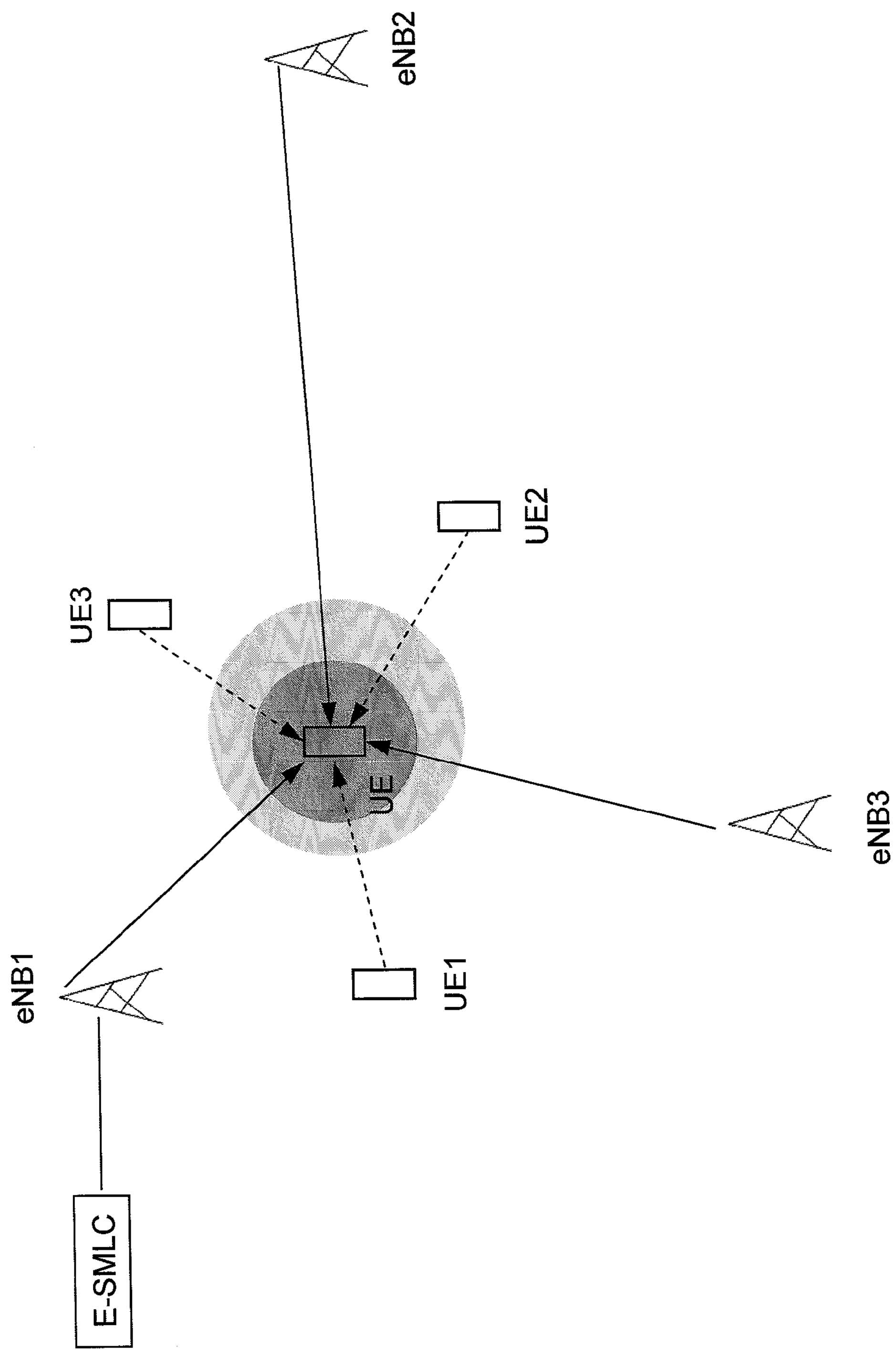
FIGS. 2*a* and 2*b* show schematic diagrams illustrating system scenarios of a timing-based positioning technique according to exemplary embodiments of the present invention.
Figure 2B:
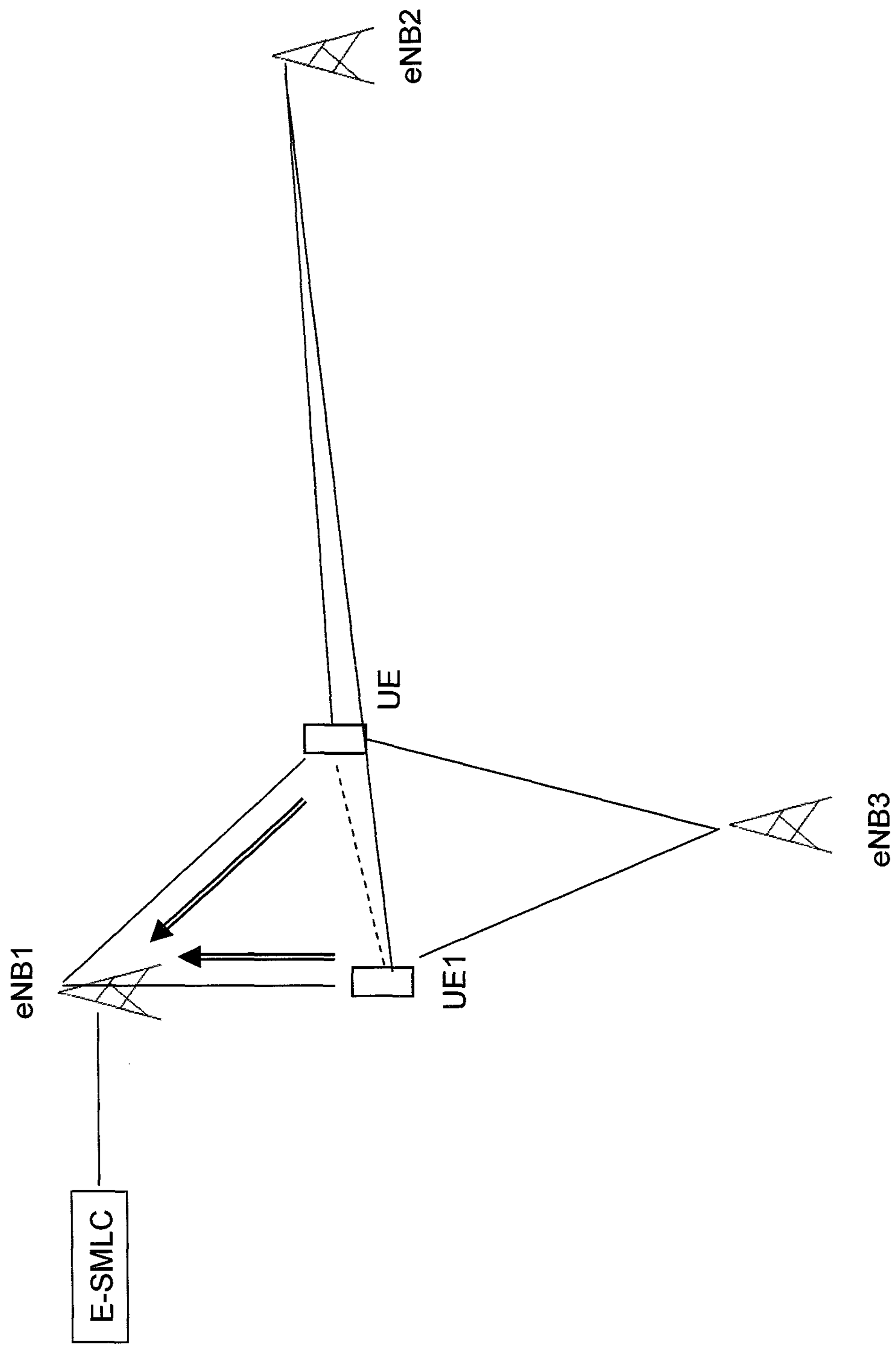

FIGS. 2*a* and 2*b* show schematic diagrams illustrating system scenarios of a timing-based positioning technique according to exemplary embodiments of the present invention. As compared with FIG. 1, any illustration of hyperbolas, probability regions and the like is omitted for the sake of clarity.

In the exemplary scenario according to FIG. 2*a*, similar to that of FIG. 1 above, it is assumed that a terminal UE is to be positioned or localized using the OTDOA-based positioning. Yet, in the exemplary scenario according to FIG. 2*a*, such OTDOA-based positioning is performed not only with respect to three base stations or access nodes eNB1, eNB2, eNB3 serving cells of the underlying cellular communication system, but additionally with respect to one or more of three terminals or other mobile nodes UE1, UE2, UE3 residing in the cells of the three base stations or access nodes eNB1, eNB2, eNB3.

In the OTDOA-based positioning according to FIG. 2*a*, required neighbor cell information and neighbor terminal information are provided from a network entity, such as an E-SMLC, to the UE via the serving base station or access node, such as eNB1 in FIG. 2*a*. The UE measures the OTDOA timing values of each neighboring cell relative to the serving cell based on such neighbor cell information (as indicated by solid arrows in FIG. 2*a*), measures timing values of one or more neighboring terminals based on such neighbor terminal information (as indicated by dashed arrows in FIG. 2*a*), and provides the measured cell-related and terminal-related OTDOA timing values to the server for triangulating the UE position based thereon, respectively. The server then calculates the UE position on the basis of the thus provided cell-related and terminal-related OTDOA timing values of the neighbor cells and the neighbor terminals as well as the local knowledge of cell/terminal positions and transmit timings.

In OTDOA positioning, position calculation is made at the network side, as timing information, such as timing advances, are known at the network side (for example, at the base station or access node). In view thereof, e.g. the base station access node may extract and provide for the position calculation the time difference between its PRS signal and UL transmission from its own system to enable the OTDOA or the position to be calculated correctly.

According to exemplary embodiments of the present invention, as the timing values of the one or more neighboring cells, the UE may measure at least one delay value between the UE and any one or more of the neighboring UEs, or the UE may measure OTDOA timing values of one or more neighboring terminals relative to one of the neighboring terminals.

As indicated in FIG. 2*a* by way of illustration of a darker grey circle in comparison to the lighter grey circle according to FIG. 1, the resulting area (probability region) for a UE position according to the timing-based positioning technique of FIG. 2*a* may be smaller than that according to the timing-based positioning technique of FIG. 1.

In the exemplary scenario according to FIG. 2*b*, the positioning circles are also omitted, and a special case of UE positioning with regard to a delay to neighboring terminal UE1 is exemplified. Namely, in this example, the delay between UE and UE1 is specifically taken into account. Such delay is determined with respect to a cell-originated position-related signal, e.g. a PRS signal from eNB1.

In such scenario, the UE1 may report its cell-related timing value, i.e. its OTDOA value (e.g. with respect to eNB1, eNB2, eNB3) together with its timing advance to serving eNB1. Further, the UE may report its cell-related timing value, i.e. its OTDOA value (e.g. with respect to eNB1, eNB2, eNB3) together with a delay value relating to UE1 (i.e. a value being indicative of a delay between UE and UE1 with respect to the eNB1-originated PRS signal) to serving eNB1. In such delay value, a timing advance value is inherently incorporated. Then, the server, e.g. the E-SMLC, may combine all of these information, particularly the OTDOA value of UE, the OTDOA value of UE1, the timing advance value of UE1, and the delay value between UE and UE1 being measured by UE, for positioning calculation, and may provide correspondingly calculated positions to UE and UE1, respectively.

According to exemplary embodiments of the present invention, when the UE position is calculated at the server, the calculated UE position may be provided from the server to the UE or to one or more of the UE, the neighboring UEs (i.e. UE1, UE2, UE3), a special purpose server(s), and the surrounding cells (i.e. eNB1, eNB2, eNB3). Such calculated UE position may be provided in accordance with a positioning request, in a predefined time interval, in an emergency scenario, a public safety scenario, an advertisement scenario, an entertainment scenario, a traffic scenario, a guidance scenario, a navigation scenario, a transport scenario, a special purpose positioning scenario, or the like. The server can proceed its processing depending on a related application, service etc., and/or the UE can continue its processing when one or more sets of positioning results are received from server.

Accordingly, a timing-based positioning technique according to exemplary embodiments of the present invention utilizes (timing information and/or timing measurements with respect to) neighboring terminals or other mobile nodes, which are present in the vicinity of an apparatus to be positioned, in addition to (timing information and/or timing measurements with respect to) neighboring base stations or access nodes, which represent a serving cell of the apparatus to be positioned and cells adjacent to the serving cell thereof, for positioning the apparatus to be positioned.

Hereinafter, procedures and functions relating to such timing-based positioning technique according to exemplary embodiments of the present invention are described in more detail with reference to FIGS. 3 to 6.

The methods, procedures and functions described hereinafter mainly relate to an apparatus to be positioned, e.g. a terminal or any other mobile node (e.g. a mobile relay node or the like). Such terminal or mobile node may comprise a mobile station (MS) or a user equipment (UE) or a modem (which may be installed as part of a MS or UE, but may be also a separate module, which can be attached to various devices, such as a vehicle). Such terminal or modem is configured to be operable in at least one given frequency range/band. Generally, it is to be noted that, when reference is made herein to a terminal, MS or UE, such reference is equally applicable to a modem (which may be installed as part of a MS or UE, but may be also a separate module, which can be attached to various devices). It is noted that the apparatus to be positioned may, at least in some exemplary embodiments, have multiple receive antennas, a diversity antenna, MIMO antennas, alternate antennas, or the like.

Generally, in the OTDOA-based positioning, a relevant time difference for each neighbor cell or terminal is measured at a certain reference point which, in cellular communication devices/modems, typically is the antenna port or connector of the apparatus to be positioned. In the present specification, for the sake of simplicity, it is assumed that the relevant time difference is measured at the apparatus to be positioned, without considering any processes or the like at or in the apparatus to be positioned.

According to exemplary embodiments of the present invention, the apparatus to be positioned may for example be a TDD-operable terminal which is configured to transmit and receive signals at/in the same frequency or frequency band, or a FDD-operable terminal which is configured to transmit and receive signals at different frequencies (frequency bands).

The subsequently described procedures according to FIGS. 3 and 4 may be carried out at any apparatus to be positioned, e.g. a terminal such as the UE according to FIG. 2, wherein an apparatus to be positioned suitable for carrying out the thus illustrated procedure may be any (mobile) apparatus to be positioned being capable of receiving signals from surrounding base stations or access nodes and terminals or other mobile nodes.

Figure 3:
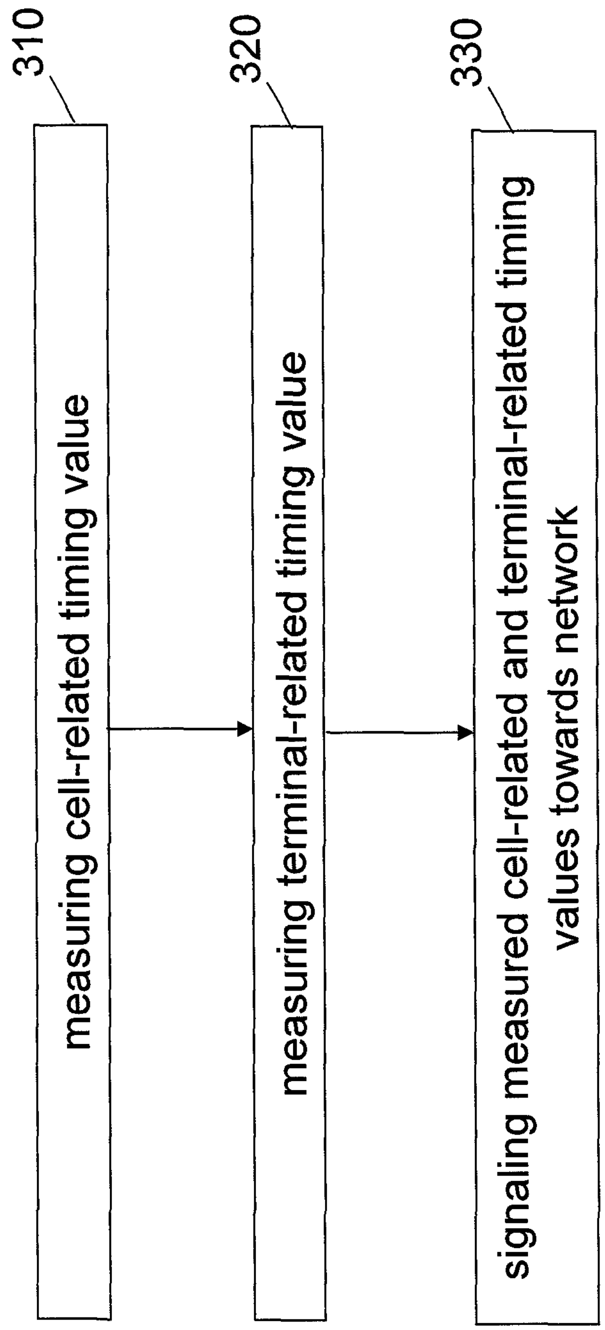
FIG. 3 shows a flowchart of a first example of a procedure at an apparatus to be positioned according to exemplary embodiments of the present invention.

FIG. 3 shows a flowchart of a first example of a procedure at an apparatus to be positioned according to exemplary embodiments of the present invention.

As shown in FIG. 3, a corresponding procedure according to exemplary embodiments of the present invention comprises an operation (310) of measuring a cell-related timing value for timing-based positioning calculation on the basis of a cell-originated positioning-related signal, an operation (320) of measuring a terminal-related timing value for timing-based positioning calculation, and an operation (330) of signaling the measured cell-related timing value and the measured terminal-related timing value towards a network side for timing-based positioning calculation.

According to exemplary embodiments of the present invention, the cell-related timing value may comprise an OTDOA timing value of one or more cells (such as e.g. eNB2 and eNB3 according to FIG. 2) with respect to a reference cell (such as e.g. eNB1 according to FIG. 2).

According to exemplary embodiments of the present invention, the terminal-related timing value may comprise any one of at least on delay value relating to at least one neighboring terminal (such as UE1 according to FIG. 2) with respect to a cell-originated positioning-related signal and a timing advance value of a terminal (such as UE1 according to FIG. 2) or an OTDOA timing value of one or more terminals (such as e.g. UE2, UE3 according to FIG. 2) with respect to a reference terminal (such as e.g. UE1 according to FIG. 2).

In particular, when being performed by UE according to FIG. 2, the cell-related timing value may comprise an OTDOA timing value with respect to a reference cell (such as e.g. eNB1), and the terminal-related timing value may comprise at least one delay value relating to at least one neighboring terminal (such as UE1) with respect to a cell-originated positioning-related signal transmitted from the reference cell (such as e.g. eNB1). When being performed by UE1 according to FIG. 2, the cell-related timing value may comprise an OTDOA timing value with respect to a reference cell (such as e.g. eNB1), and the terminal-related timing value may comprise a timing advance value of UE1.

According to exemplary embodiments of the present invention, the cell-originated positioning-related signal may comprise a PRS signal transmitted (in the DL direction) from at least one of a serving cell and a neighboring cell of the serving cell, and the terminal-originated positioning-related signal comprises a PRS response signal from at least one terminal, which is transmitted (in the UL direction) in response to a (DL) PRS signal from at least one of a serving cell and a neighboring cell of the serving cell.

According to exemplary embodiments of the present invention, a timing advance value of a terminal (such as e.g. UE1 according to FIG. 2) may be taken into account.

According to exemplary embodiments of the present invention, the measured cell-related and terminal-related timing values may be signaled towards an E-SMLC or a corresponding network entity responsible for performing the timing-based positioning calculation. Such signaling may be accomplished via the serving cell (i.e. its base station or access node). The procedures at the network side, e.g. the SMLC or a corresponding network entity, will be described below with reference to FIGS. 5 and 6.

Figure 4:
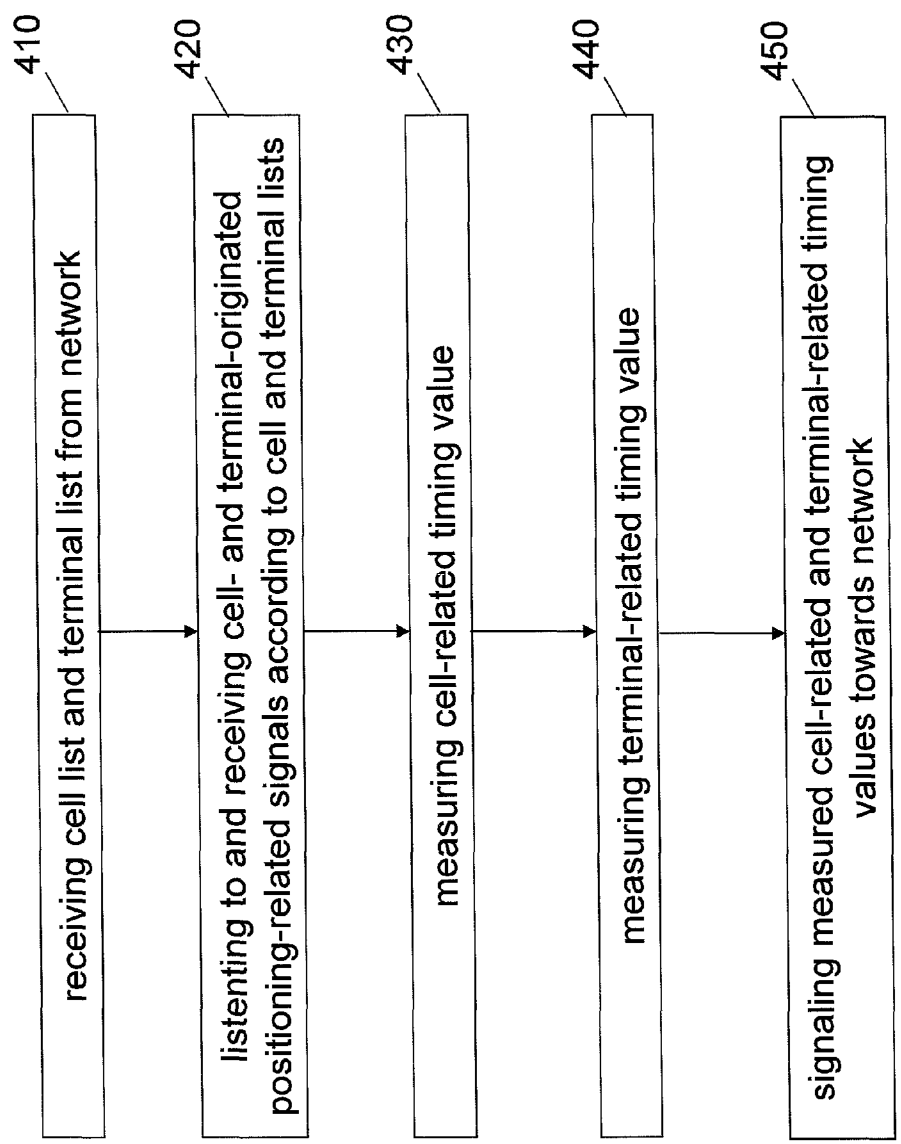
FIG. 4 shows a flowchart of a second example of a procedure at an apparatus to be positioned according to exemplary embodiments of the present invention.

FIG. 4 shows a flowchart of a second example of a procedure at an apparatus to be positioned according to exemplary embodiments of the present invention.

As shown in FIG. 4, a corresponding procedure according to exemplary embodiments of the present invention comprises an operation (410) receiving, from the network side, a cell list of cells to be listened for cell-originated positioning-related signals and a terminal list of at least one terminal to be listened for terminal-originated positioning-related signals, and an operation (420) of listening to and receiving cell-originated positioning-related signals from the cells in the cell list and at least one terminal-originated positioning-related signal from the at least one terminal in the terminal list. The operations 430 to 450 according to FIG. 4 functionally correspond to the operations 310 to 330 according to FIG. 3, which are based on the results of the preceding operations 410 and 420 according to FIG. 4. That is to say, in the operations 430 and 440, the cell-related timing value is measured on the basis of the cell-originated positioning-related signals received in operation 420 according to the cell list provided in operation 410, and the terminal-related timing value is measured on the basis of the at least one terminal-originated positioning-related signal received in operation 420 according to the terminal list provided in operation 410. Further, in the operation 450, the thus measured cell-related timing values and the thus measured at least one terminal-related timing value are signaled towards the network.

According to exemplary embodiments of the present invention, the cell list may correspond to a list of potential serving and neighboring cells in the vicinity of the apparatus to be positioned, which are potentially usable for the purposes of timing-based positioning, and the terminal list may correspond to a list of potential serving and neighboring terminals in the vicinity of the apparatus to be positioned, which are potentially usable for the purposes of timing-based positioning. The apparatus to be positioned may also select one or more neighbor terminals out of the listed neighbor terminals for listening purposes. Such local selection may be made by predefined criteria, such as on the basis of the knowledge of one or more terminals' location, the knowledge that terminals are GPS positioned, the knowledge that terminals are in proximity, the knowledge that terminals belong to a specific group, or the like. A cell or terminal may be potentially usable for the purposes of timing-based positioning, when the apparatus to be positioned is capable of receiving a positioning-related signal from that cell (i.e. its base station or access node) or terminal, especially when the position of such cell or terminal is known (with appropriate accuracy/reliability) at the E-SMLC or a corresponding network entity responsible for performing the timing-based positioning calculation.

According to exemplary embodiments of the present invention, the listening in operation 420 may be accomplished on the basis of a TDD operability of the apparatus to be positioned. As an example in this regard, a TDD-operable apparatus to be positioned may listen to and receive the positioning-related signals (in particular, those from neighboring terminals) in a time period in which an own transmission is skipped, i.e. in an own transmission period which is reconfigured for receiving (terminal-originated) positioning-related signals. As another example in this regard, a TDD-operable apparatus to be positioned may additionally or alternatively listen to and receive the positioning-related signals (in particular, those from neighboring terminals) via at least one antenna, via which no own transmission is scheduled at that time. In the latter example, when an apparatus to the positioned has for example three antennas/receivers, an own transmission (at corresponding transmission periods) may be performed by a first antenna/receiver, while the second and third antennas/receivers may be used for listening to and reception of (terminal-originated) positioning-related signals (at corresponding transmission periods of neighboring terminals) only.

According to exemplary embodiments of the present invention, the listening in operation 420 may be accomplished on the basis of a FDD operability of the apparatus to be positioned. As an example in this regard, a FDD-operable apparatus to be positioned may listen to and receive the positioning-related signals (in particular, those from neighboring terminals) at a frequency or in a frequency range, at/in which the apparatus does not transmit signals, and at/in which the apparatus is capable of receiving signals and/or perform measurements. That is to say, the listening may be performed at a frequency or in a frequency range, which may be reconfigured for receiving (terminal-originated) positioning-related signals. As another example in this regard, a FDD-operable apparatus to be positioned may additionally or alternatively listen to and receive the positioning-related signals (in particular, those from neighboring terminals) via at least one antenna, via which no other (data-related) receiving operation is to be carried out. In the latter example, when an apparatus to be positioned has for example two antennas/receivers, a data-related receiving operation (at corresponding receiving frequencies) may be performed by one antenna/receiver, while the alternate antenna/receiver may be used for listening to and reception of (terminal-originated) positioning-related signals (at corresponding receiving frequencies of neighboring terminals) only.

According to exemplary embodiments of the present invention, the cell-related and/or terminal-related timing values may be measured by using one of an intra-frequency or single-carrier measurement, an inter-frequency or multiple-carrier measurement and a measurement on carrier aggregation components. When the relevant cells and/or terminals respectively operate at/in multiple or mutually different frequencies or frequency bands (e.g. the reference cell/terminal and the neighboring cells/terminals are operating at the different carriers), corresponding measurements at the apparatus to be positioned, as outlined above, may be accomplished at/in such different frequencies or frequency bands (when the apparatus to be positioned is capable of receiving corresponding positioning-related signals in such different frequencies or frequency bands).

The subsequently described procedures according to FIGS. 5 and 6 may be carried out at the network side, i.e. a network entity responsible for performing the timing-based positioning calculation, such as e.g. the E-SMLC according to FIG. 2, where the timing-based positioning calculation may be carried out for any apparatus to be positioned, e.g. a terminal such as the UE according to FIG. 2.

Figure 5:
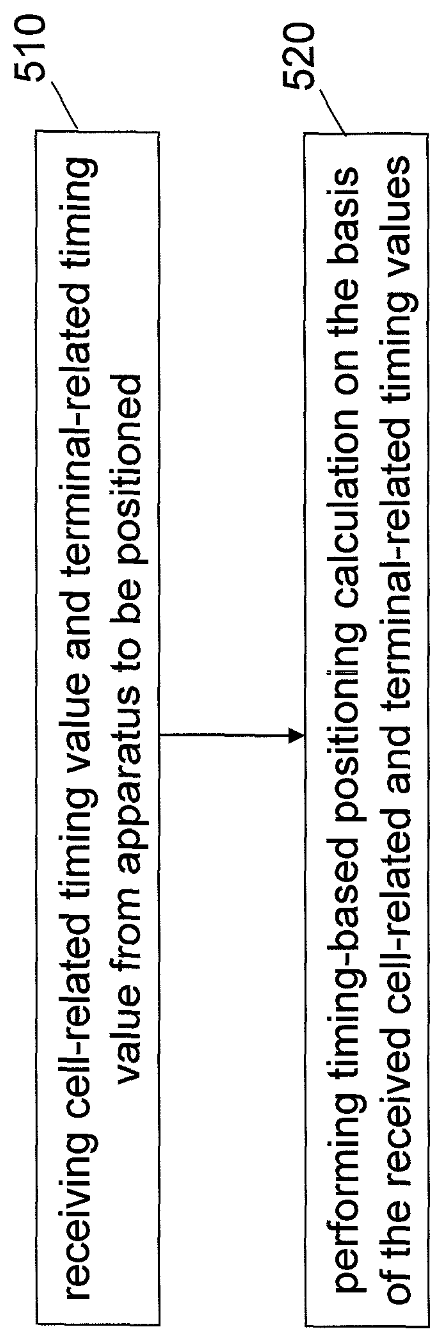
FIG. 5 shows a flowchart of a first example of a procedure at a network entity according to exemplary embodiments of the present invention.

FIG. 5 shows a flowchart of a first example of a procedure at a network entity according to exemplary embodiments of the present invention.

As shown in FIG. 5, a corresponding procedure according to exemplary embodiments of the present invention comprises an operation (510) of receiving a cell-related timing value and a terminal-related timing value for timing-based positioning calculation from an apparatus to be positioned, and an operation (520) of performing timing-based positioning calculation relating to the apparatus to be positioned on the basis of the received cell-related and terminal-related timing values.

According to exemplary embodiments of the present invention, the timing-based positioning calculation in operation 520 may be performed in any conceivable manner. For example, assuming that a total of three timing values are available, a position of the apparatus to be positioned may be calculated by separately calculating possible positions according to any one of the three timing values, respectively, and thereafter combining the three separate positioning results into a consolidated positioning result. In a simplified consideration, the three separate positioning results could be regarded as three circles of probability regions, and the consolidated positioning result could be regarded as the intersection of the three probability circles.

According to exemplary embodiments of the present invention, the timing-based positioning calculation in operation 520 may be performed using known positions of cells and terminals surrounding the apparatus to be positioned, with which the received cell-related and terminal-related timing values are in relationship. That is to say, as in the above-outlined concept of OTDOA-based positioning, transmit timings and geographical locations of the cells and terminals being involved in the positioning process may be incorporated together with the respective (cell-related and terminal-related) timing values, i.e. timing difference values.

According to exemplary embodiments of the present invention, the cell-related timing value may comprise an OTDOA timing value of one or more cells (such as e.g. eNB2 and eNB3 according to FIG. 2) with respect to a reference cell (such as e.g. eNB1 according to FIG. 2).

According to exemplary embodiments of the present invention, the terminal-related timing value may comprise any one of at least one delay value relating to at least one neighboring terminal (such as UE1 according to FIG. 2) with respect to a cell-originated positioning-related signal and a timing advance value of a terminal (such as UE1 according to FIG. 2) or an OTDOA timing value of one or more terminals (such as e.g. UE2, UE3 according to FIG. 2) with respect to a reference terminal (such as e.g. UE1 according to FIG. 2).

In particular, relating to UE according to FIG. 2, the cell-related timing value may comprise an OTDOA timing value with respect to a reference cell (such as e.g. eNB1), and the terminal-related timing value may comprise at least one delay value relating to at least one neighboring terminal (such as UE1) with respect to a cell-originated positioning-related signal transmitted from the reference cell (such as e.g. eNB1). Relating to UE1 according to FIG. 2, the cell-related timing value may comprise an OTDOA timing value with respect to a reference cell (such as e.g. eNB1), and the terminal-related timing value may comprise a timing advance value of UE1.

According to exemplary embodiments of the present invention, the timing-based positioning calculation is performed with corresponding information relating to the respective apparatus to be positioned, e.g. UE and UE1 according to FIG. 2.

According to exemplary embodiments of the present invention, a timing advance value of the terminal (such as e.g. UE1 according to FIG. 2) may be additionally taken into account. Referring to the procedure according to FIG. 5, the terminal-related timing value received in operation 510 may incorporate the timing advance value of the terminal with respect to the reference cell.

According to exemplary embodiments of the present invention, the measured cell-related and terminal-related timing values may be received from the apparatus to be positioned via the serving cell (i.e. its base station or access node).

Figure 6:
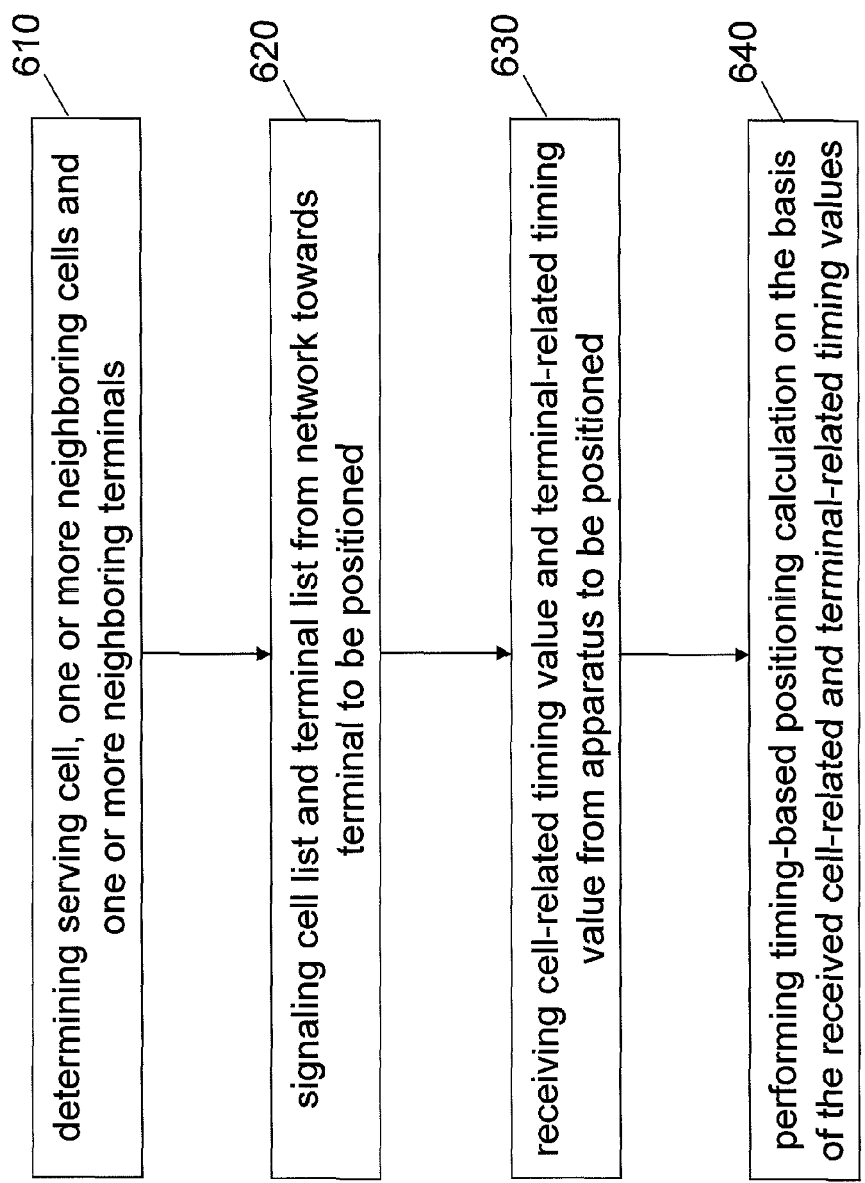
FIG. 6 shows a flowchart of a second example of a procedure at a network entity according to exemplary embodiments of the present invention.

FIG. 6 shows a flowchart of a second example of a procedure at a network entity according to exemplary embodiments of the present invention.

As shown in FIG. 6, a corresponding procedure according to exemplary embodiments of the present invention comprises an operation (610) of determining a serving cell and at least one neighboring cell of the serving cell for the apparatus to be positioned, and determining at least one neighboring terminal of the apparatus to be positioned, and an operation (620) of signaling, towards the apparatus to be positioned, a cell list of the determined cells as cells to be listened for cell-originated positioning-related signals and a terminal list of the at least one determined terminal as at least one terminal to be listened for terminal-originated positioning-related signals. The operations 630 and 640 according to FIG. 6 functionally correspond to the operations 510 and 520 according to FIG. 5, which are based on the results of the preceding operations 610 and 620 according to FIG. 6. That is to say, in the operations 630 and 640, the cell-related timing value being received relates to cells according to the cell list determined and signaled in operations 610 and 620, and the at least one terminal-related timing value being received relates to at least one terminal according to the terminal list determined and signaled in operations 610 and 620. Further, in the operation 640, the thus received cell-related timing values and the thus received at least one terminal-related timing value are used for timing-based positioning calculation.

According to exemplary embodiments of the present invention, the timing-based positioning calculation in operation 640 may be performed using positions of the serving cell, the one or more neighboring cells, and the one or more neighboring terminals, as listed in the signaled cell and terminal lists. In this regard, positions of cells may be available as pre-stored positions of their (stationary) base stations or access nodes, respectively. Further, positions of terminals or other mobile nodes (as well as mobile base stations or access node, if any) may be available as a result of a positioning thereof according to any positioning technique, such as e.g. assisted satellite positioning, geodesy measurement methods, cell ID based positioning, OTDOA-based positioning, or the like. For example, actual positions of terminals or other mobile nodes may be GPS positions thereof, as stored at the network entity performing the procedure according to FIG. 5 or 6.

According to exemplary embodiments of the present invention, the cell list and the terminal list may be determined so as to comply with the above-outlined characteristics of the thus listed cells and terminal/s, respectively. Namely, the cell list may correspond to a list of potential serving and neighboring cells in the vicinity of the apparatus to be positioned, which are potentially usable for the purposes of timing-based positioning, and the terminal list may correspond to a list of potential serving and neighboring terminals in the vicinity of the apparatus to be positioned, which are potentially usable for the purposes of timing-based positioning. The network entity performing such procedure may select one or more neighbor terminals to be listed for listening purposes. Such selection may be made by predefined criteria, such as on the basis of the knowledge of one or more terminals' location, the knowledge that terminals are GPS positioned, the knowledge that terminals are in proximity, the knowledge that terminals belong to a specific group, the knowledge of terminals' position accuracy, the knowledge of terminals' movement information, or the like.

According to exemplary embodiments of the present invention, while reference is separately made to cell and terminal lists, both potential cells and terminals may also be handled within a single list or multiple lists containing one or both of types of potentially usable elements (i.e. cells and terminals).

Generally, the above-described procedures and functions may be implemented by respective functional elements, processors, or the like, as described below.

According to exemplary embodiments of the present invention, although this is not illustrated in the accompanying drawings, the network entity responsible for performing the timing-based positioning calculation, i.e. the apparatus performing any one of the procedures according to FIGS. 5 and 6, may also perform grouping of terminals and/or apparatuses to be positioned within a certain geographical area. Namely, terminals in a relevant geographical area may be grouped into terminals using only a conventional timing-based positioning technique (such as OTDOA), terminals serving a first group for the above-described timing-based positioning technique (such as OTDOA) according to exemplary embodiments of the present invention, terminals serving a second group for the above-described timing-based positioning technique (such as OTDOA) according to exemplary embodiments of the present invention, and so on.

Such grouping may for example also be beneficial for finding persons faster in emergency or rescue scenarios or public safety scenarios or the like, as outlined below.

Referring to the example according to FIG. 2, UE may for example be grouped into a first group of terminals, and UE1 may for example be grouped into a second group of terminals. In such case, the first group of terminals could contain those terminals configured for measuring and reporting e.g. the OTDOA value as the cell-related timing value and e.g. the delay value relating to a neighboring terminal with respect to a cell-originated positioning-related signal (e.g. a PRS response signal), while the second group of terminals could contain those terminals configured for measuring and reporting e.g. the OTDOA value as the cell-related timing value and e.g. its timing advance value as the terminal-related timing value. Stated in other words, the first group of terminals could contain those terminals configured for listening to and receiving cell-originated positioning-related signal (e.g. a PRS response signal) from neighboring terminals, while the second group of terminals could contain those terminals configured for not listening to and receiving cell-originated positioning-related signal (e.g. a PRS response signal) from neighboring terminals. While in the foregoing exemplary embodiments of the present invention are described mainly with reference to methods, procedures and functions, corresponding exemplary embodiments of the present invention also cover respective apparatuses, network nodes and systems, including both software and/or hardware thereof.

According to exemplary embodiments of the present invention, although this is not illustrated in the accompanying drawings, the network entity responsible for performing the timing-based positioning calculation, i.e. the apparatus performing any one of the procedures according to FIGS. 5 and 6, may also perform an operation of forwarding the calculated positioning result towards another network entity such as an emergency-related network entity (e.g. an emergency or rescue center, a police department, a fire department, public safety, or the like). Also, in such forwarding, grouping information of terminals residing in a relevant area could additionally be forwarded. Such forwarding is not restricted to, but may be specifically beneficial in emergency or rescue cases, i.e. for those apparatuses being positioned within a certain geographical area in which an emergency or rescue case is currently prevailing.

By virtue of the grouping information, persons may be found even faster. Among others, this may be for example due to the knowledge of the characteristics of their terminals in terms of positioning, thereby enabling to better evaluate the accuracy, reliability, etc. of their calculated positions.

Generally, the above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 7, while for the sake of brevity reference is made to the detailed description with regard to FIGS. 1 to 6.

Figure 7:
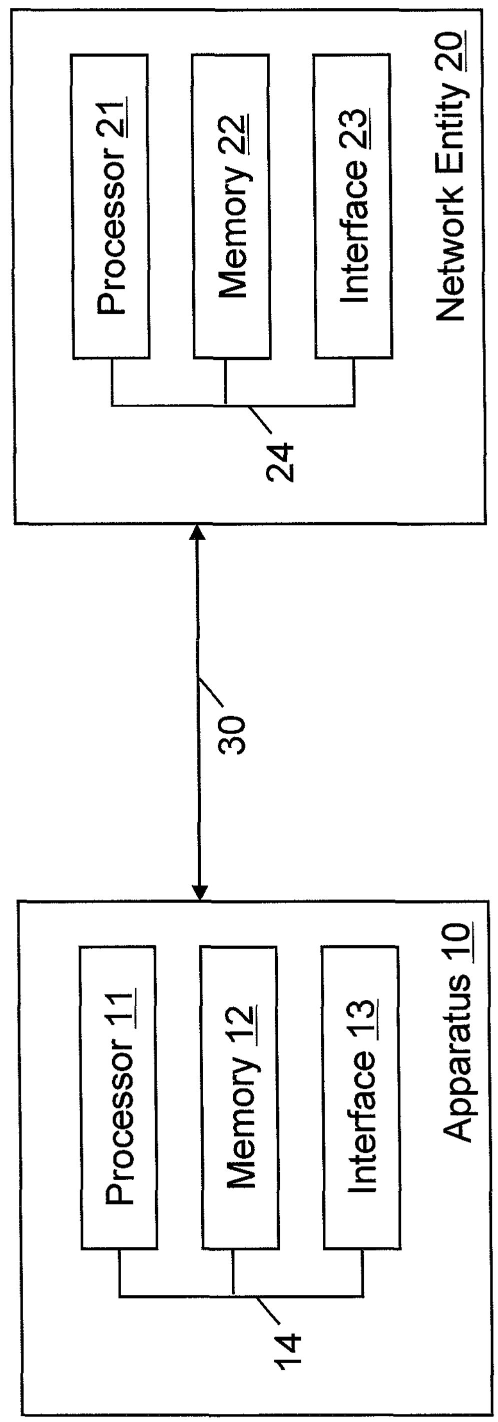
FIG. 7 shows a schematic block diagram illustrating exemplary apparatuses according to exemplary embodiments of the present invention.

In FIG. 7 below, which is noted to represent a simplified block diagram, the solid line blocks are basically configured to perform respective operations as described above. The entirety of solid line blocks are basically configured to perform the methods and operations as described above, respectively. With respect to FIG. 7, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 7, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 7 shows a schematic block diagram illustrating exemplary apparatuses according to exemplary embodiments of the present invention.

In view of the above, the thus described apparatuses 10 and 20 are suitable for use in practicing the exemplary embodiments of the present invention, as described herein. The thus described apparatus 10 may represent an (part of an) apparatus to be positioned, such as a terminal or other mobile node, e.g. a mobile station MS or user equipment UE or a modem (which may be installed as part of a MS or UE, but may be also a separate module, which can be attached to various devices, as described above), and may be configured to perform a procedure and/or functionality as described in conjunction with any one of FIGS. 2 to 4. The thus described apparatus 20 may represent a (part of a) network entity responsible for timing-based positioning calculation, such as an E-SMLC or a corresponding network entity, and may be configured to perform a procedure and/or functionality as described in conjunction with any one of FIGS. 2, 5 and 6.

An apparatus or terminal to be positioned according to exemplary embodiments of the present invention may for example comprise any (short range, cellular, satellite, etc.) wireless communication device such as car communication devices, mobile phones, smart phones, communicators, USB devices, laptops, finger computers, machine-to-machine terminals, device-to-device terminals, routers, terminals of pico/micro/femto cells and the like with wireless communication capability, and so on.

As indicated in FIG. 7, according to exemplary embodiments of the present invention, each of the apparatuses comprises a processor 11/22, a memory 12/22 and an interface 13/23, which are connected by a bus 14/24 or the like, and the apparatuses may be connected via a link 30. The link 30 may be a physical and/or logical coupling, which on the one hand is implementation-independent (e.g. wired or wireless) and on the other hand may also comprise an arbitrary number of intermediary functional entities not shown in FIG. 7 (such as a base station or access node, e.g. that of a serving cell of the apparatus to be positioned, such as eNB1 illustrated in FIG. 2). The direction of arrow is meant to illustrate the direction in which certain operations are performed and/or the direction in which certain data is transferred.

The processor 11/21 and/or the interface 13/23 may be facilitated for communication over a (hardwire or wireless) link, respectively. The interface 13/23 may comprise a suitable receiver or a suitable transmitter-receiver combination or transceiver, which is coupled to one or more antennas or communication means for (hardwire or wireless) communications with the linked or connected device(s), respectively. The interface 13/23 is generally configured to communicate with another apparatus, i.e. the interface thereof.

The memory 12/22 may store respective programs assumed to include program instructions or computer program code that, when executed by the respective processor, enables the respective electronic device or apparatus to operate in accordance with the exemplary embodiments of the present invention. For example, the memory 12 of the apparatus 10 may store the cell/terminal lists and/or any measurement results or the like, and the memory 23 of the network entity 20 may store the cell/terminal lists, the received timing values, available positions of cells and/or terminals or the like.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the apparatus 10 comprises at least one processor 11, at least one memory 12 including computer program code, and at least one interface 13 configured for communication with at least another apparatus. The processor (i.e. the at least one processor 11, with the at least one memory 12 and the computer program code) is configured to perform measuring a cell-related timing value for timing-based positioning calculation on the basis of a cell-originated positioning-related signal, measuring a terminal-related timing value for timing-based positioning calculation, and signaling the measured cell-related timing value and the measured terminal-related timing value towards a network side for timing-based positioning calculation.

According to exemplary embodiments of the present invention, the processor (i.e. the at least one processor 11, with the at least one memory 12 and the computer program code) may be configured to:

perform receiving, from the network side, a cell list of cells to be listened for cell-originated positioning-related signals and a terminal list of at least one terminal to be listened for terminal-originated positioning-related signals, and listening to and receiving cell-originated positioning-related signals from the cells in the cell list and at least one terminal-originated positioning-related signal from the at least one terminal in the terminal list, wherein the at least one processor, with the at least one memory and the computer program code, is configured to cause the apparatus to measure the cell-related timing value on the basis of the received cell-originated positioning-related signals, and to measure the terminal-related timing value on the basis of the at least one received terminal-originated positioning-related signal.

According to exemplary embodiments of the present invention, an apparatus representing the network entity 20 comprises at least one processor 20, at least one memory 22 including computer program code, and at least one interface 23 configured for communication with at least another apparatus. The processor (i.e. the at least one processor 21, with the at least one memory 22 and the computer program code) is configured to perform receiving a cell-related timing value and a terminal-related timing value for timing-based positioning calculation from an apparatus to be positioned, and performing timing-based positioning calculation relating to the apparatus to be positioned on the basis of the received cell-related and terminal-related timing values.

According to exemplary embodiments of the present invention, the processor (i.e. the at least one processor 21, with the at least one memory 22 and the computer program code) may be configured to perform:

determining a serving cell and at least one neighboring cell of the serving cell for the apparatus to be positioned, and determining at least one neighboring terminal of the apparatus to be positioned, and signaling, towards the apparatus to be positioned, a cell list of the determined cells as cells to be listened for cell-originated positioning-related signals and a terminal list of the at least one determined terminal as at least one terminal to be listened for terminal-originated positioning-related signals, wherein the cell-related timing value relates to the cells in the cell list, and the terminal-related timing value relates to the at least one terminal in the terminal list, and/or the timing-based positioning calculation using positions of the serving cell, the one or more neighboring cells, and the one or more neighboring terminals.

For further details of specifics regarding functionalities according to exemplary embodiments of the present invention, reference is made to the foregoing description in conjunction with FIGS. 2 to 6.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any procedural step or functionality is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package (SIP), or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and/or exemplary embodiments thereof provide measures for enabling a terminal-assisted improvement of timing-based positioning accuracy. Such measures may exemplarily comprise measuring a cell-related timing value for timing-based positioning calculation on the basis of a cell-originated positioning-related signal and measuring a terminal-related timing value for timing-based positioning calculation at an apparatus to be positioned, and utilizing the measured cell-related timing value and the measured terminal-related timing value for timing-based positioning calculation relating to the apparatus to be positioned at a network side.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
DL Downlink
eNB evolved Node B (E-UTRAN base station)
E-SMLC Evolved Serving Mobile Location Center
FDD Frequency Division Duplex
GPS Global Positioning System
LCS Location Service/Location-based Service
LTE Long Term Evolution
LTE-A Long Term Evolution Advanced
MIMO Multiple-Input Multiple-Output
OTDOA Observed Time Difference of Arrival
PRS Positioning Reference Signal
TDD Time Division Duplex
UE User Equipment
UL Uplink

What is claimed is:

1. A method for operating a user equipment, the method comprising measuring at the user equipment a cell-related timing value for timing-based positioning calculation on the basis of a cell-originated positioning-related signal, measuring at the user equipment a terminal-related timing value for timing-based positioning calculation, wherein the terminal-related timing value is for a neighboring mobile terminal different from the user equipment, and signaling the measured cell-related timing value and the measured terminal-related timing value from the user equipment towards a network side for timing-based positioning calculation.

2. The method according to claim 1, further comprising receiving, from the network side, a cell list of cells to be listened for cell-originated positioning-related signals and a terminal list of at least the neighboring mobile terminal to be listened for terminal-originated positioning-related signals, and listening to and receiving cell-originated positioning-related signals from the cells in the cell list and from at least one terminal-originated positioning-related signal from at least the neighboring mobile terminal in the terminal list, wherein the cell-related timing value is measured on the basis of the received cell-originated positioning-related signals, and the terminal-related timing value is measured on the basis of the at least one received terminal-originated positioning-related signal.

3. The method according to claim 2, wherein the cell-related timing value and/or the terminal-related timing value is measured by using one of an intra-frequency or single-carrier measurement, an inter-frequency or multiple-carrier measurement and a measurement on carrier aggregation components, and/or the cell-originated positioning-related signal comprises a positioning reference signal from at least one of a serving cell and a neighboring cell of the serving cell, and the terminal-originated positioning-related signal comprises a positioning reference response signal from at least the neighboring mobile terminal transmitted in response to a positioning reference signal from at least one of a serving cell and a neighboring cell of the serving cell.

4. The method according to claim 1, wherein the method is executed by the user equipment or a modem thereof in time division duplex, wherein the cell-originated and/or terminal-originated positioning-related signals are received in a time period in which an own transmission of the user equipment is skipped and during which no own transmission of the user equipment is scheduled, and/or the method is executed by the user equipment or a modem thereof in frequency division duplex, wherein the cell-originated and/or terminal-originated positioning-related signals are received at a time and in a frequency band in which no own communication of the user equipment is scheduled.

5. A method for operating a network entity, the method comprising receiving at the network entity, from a user equipment whose position is to be determined, a cell-related timing value and a terminal-related timing value for timing-based positioning calculation, where the terminal-related timing value is for a mobile terminal that is neighboring to the user equipment, and performing at the network entity timing-based positioning calculation relating to the user equipment whose position is to be determined on the basis of the received cell-related and terminal-related timing values.

6. The method according to claim 5, further comprising determining a serving cell and at least one neighboring cell of the serving cell for the user equipment whose position is to be determined, and determining at least one neighboring terminal of the user equipment whose position is to be determined, and signaling, towards the user equipment whose position is to be determined, a cell list of the determined cells as cells to be listened for cell-originated positioning-related signals and a terminal list of at least the mobile terminal that is neighboring to the user equipment to be listened for terminal-originated positioning-related signals, wherein the cell-related timing value relates to the cells in the cell list, and the terminal-related timing value relates to at least the mobile terminal in the terminal list.

7. The method according to claim 6, wherein the timing-based positioning calculation is performed using positions of the serving cell, the one or more neighboring cells, and the one or more neighboring terminals.

8. The method according to claim 5, wherein the network entity is a serving mobile location center.

9. An apparatus comprising at least one processor, at least one memory including computer program code, and at least one interface configured for communication with at least another apparatus, the at least one processor, with the at least one memory and the computer program code, being configured to cause the apparatus to perform:

measuring a cell-related timing value for timing-based positioning calculation on the basis of a cell-originated positioning-related signal, measuring a terminal-related timing value for timing-based positioning calculation, wherein the terminal-related timing value is for a neighboring mobile terminal different from a user equipment hosting the apparatus, and signaling the measured cell-related timing value and the measured terminal-related timing value towards a network side for timing-based positioning calculation.

10. The apparatus according to claim 9, wherein the at least one processor, with the at least one memory and the computer program code, is configured to cause the apparatus to perform:

receiving, from the network side, a cell list of cells to be listened for cell-originated positioning-related signals and a terminal list of at least the neighboring mobile terminal to be listened for terminal-originated positioning-related signals, and listening to and receiving cell-originated positioning-related signals from the cells in the cell list and from at least one terminal-originated positioning-related signal from at least the neighboring mobile terminal in the terminal list, wherein the at least one processor, with the at least one memory and the computer program code, is configured to cause the apparatus to measure the cell-related timing value on the basis of the received cell-originated positioning-related signals, and to measure the terminal-related timing value on the basis of the at least one received terminal-originated positioning-related signal.

11. The apparatus according to claim 10, wherein the at least one processor, with the at least one memory and the computer program code, is configured to cause the apparatus to measure the cell-related timing value and/or the terminal-related timing value by using one of an intra-frequency or single-carrier measurement, an inter-frequency or multiple-carrier measurement and a measurement on carrier aggregation components, and/or the cell-originated positioning-related signal comprises a positioning reference signal from at least one of a serving cell and a neighboring cell of the serving cell, and the terminal-originated positioning-related signal comprises a positioning reference response signal from at least the neighboring mobile terminal transmitted in response to a positioning reference signal from at least one of a serving cell and a neighboring cell of the serving cell.

12. The apparatus according to claim 9, wherein the apparatus is a terminal, user equipment, mobile station or modem, and/or the apparatus is a terminal, user equipment, mobile station or modem operable in time division duplex, wherein the at least one processor, with the at least one memory and the computer program code, is configured to cause the apparatus to receive the cell-originated and/or terminal-originated positioning-related signals in a time period in which an own transmission of the terminal, user equipment, mobile station or modem is skipped and/or via at least one antenna of the terminal, user equipment, mobile station or modem, and during which no own transmission of the terminal, user equipment, mobile station or modem is scheduled, and/or the apparatus is a terminal, user equipment, mobile station or modem operable in frequency division duplex, wherein the at least one processor, with the at least one memory and the computer program code, is configured to cause the apparatus to receive the cell-originated and/or terminal-originated positioning-related signals at a time and in a frequency band in which no own communication of the terminal, user equipment, mobile station or modem is scheduled.

13. An apparatus comprising at least one processor, at least one memory including computer program code, and at least one interface configured for communication with at least another apparatus, the at least one processor, with the at least one memory and the computer program code, being configured to cause the apparatus to perform:

receiving, from a user equipment whose position is to be determined, a cell-related timing value and a terminal-related timing value for timing-based positioning calculation, where the terminal-related timing value is for a mobile terminal that is neighboring to the user equipment, and performing timing-based positioning calculation relating to the user equipment whose position is to be determined on the basis of the received cell-related and terminal-related timing values.

14. The apparatus according to claim 13, wherein the at least one processor, with the at least one memory and the computer program code, is configured to cause the apparatus to perform:

determining a serving cell and at least one neighboring cell of the serving cell for the user equipment whose position is to be determined, and determining at least one neighboring terminal of the user equipment whose position is to be determined, and signaling, towards the user equipment whose position is to be determined, a cell list of the determined cells as cells to be listened for cell-originated positioning-related signals and a terminal list of at least the mobile terminal that is neighboring to the user equipment to be listened for terminal-originated positioning-related signals, wherein the cell-related timing value relates to the cells in the cell list, and the terminal-related timing value relates to at least the mobile terminal in the terminal list.

15. The apparatus according to claim 14, wherein the at least one processor, with the at least one memory and the computer program code, is configured to cause the apparatus to perform the timing-based positioning calculation using positions of the serving cell, the one or more neighboring cells, and the one or more neighboring terminals.

16. The apparatus according to claim 13, wherein the apparatus is a network entity responsible for positioning calculation, and/or the apparatus is a serving mobile location center.

17. A memory storing computer-executable computer program code which, when run on a computer, is configured to cause a host user equipment to at least:

measure a cell-related timing value for timing-based positioning calculation on the basis of a cell-originated positioning-related signal, measure a terminal-related timing value for timing-based positioning calculation, wherein the terminal-related timing value is for a neighboring mobile terminal different from the user equipment, and signal the measured cell-related timing value and the measured terminal-related timing value towards a network side for timing-based positioning calculation.

* * * * *

UNITED STATES PATENT AND TRADEMARK OFFICE
CERTIFICATE OF CORRECTION

PATENT NO. : 8,724,595 B2
APPLICATION NO. : 13/336194
DATED : May 13, 2014
INVENTOR(S) : Rousu It is certified that error appears in the above-identified patent and that said Letters Patent is hereby corrected as shown below:

In the Claims

Column 18, line 8-20, insert the following claim:

-- A method for operating a user equipment, the method comprising
measuring at the user equipment a cell-related timing value for timing-based positioning calculation on the basis of a cell-originated positioning-related signal, the cell-related timing value comprises an observed time difference of arrival of one or more cells with respect to a reference cell,
measuring at the user equipment a terminal-related timing value for timing-based positioning calculation,
wherein the terminal-related timing value is for a neighboring mobile terminal different from the user equipment, the terminal-related timing value comprises at least one delay value relating to at least the neighboring mobile terminal or a timing advance value of at least the neighboring mobile terminal or an observed time difference of arrival of at least the neighboring mobile terminal with respect to the user equipment, and
signaling the measured cell-related timing value and the measured terminal-related timing value from the user equipment towards a network side for timing-based positioning calculation. --

Column 18, line 66 and column 19, line 1-10, insert the following claim:

-- A method for operating a network entity, the method comprising
receiving at the network entity, from a user equipment whose position is to be determined, a cell-related timing value and a terminal-related timing value for timing-based positioning calculation, where the terminal-related timing value is for a mobile terminal that is neighboring to the user equipment,
wherein the cell-related timing value comprises an observed time difference of arrival of one or more cells with respect to a reference cell, and the terminal-related timing value comprises at least one delay value relating to at least the neighboring mobile terminal with respect to a cell-originated Signed and Sealed this
Twenty-third Day of December, 2014

Michelle K. Lee

Michelle K. Lee
*Deputy Director of the United States Patent and Trademark Office* positioning-related signal or a timing advance value of the neighboring mobile terminal or an observed time difference of arrival of one or more neighboring mobile terminals with respect to the user equipment, and performing at the network entity timing-based positioning calculation relating to the user equipment whose position is to be determined on the basis of the received cell-related and terminal-related timing values. --

Column 19, line 34-53, insert the following claim:

-- An apparatus comprising at least one processor, at least one memory including computer program code, and at least one interface configured for communication with at least another apparatus, the at least one processor, with the at least one memory and the computer program code, being configured to cause the apparatus to perform:

measuring at the user equipment a cell-related timing value for timing-based positioning calculation on the basis of a cell-originated positioning-related signal, the cell-related timing value comprises an observed time difference of arrival of one or more cells with respect to a reference cell, measuring at the user equipment a terminal-related timing value for timing-based positioning calculation, wherein the terminal-related timing value is for a neighboring mobile terminal different from the user equipment, the terminal-related timing value comprises at least one delay value relating to at least the neighboring mobile terminal or a timing advance value of at least the neighboring mobile terminal or an observed time difference of arrival of at least the neighboring mobile terminal with respect to the user equipment, and signaling the measured cell-related timing value and the measured terminal-related timing value towards a network side for timing-based positioning calculation. --

Column 20, line 49-67, insert the following claim:

-- An apparatus comprising at least one processor, at least one memory including computer program code, and at least one interface configured for communication with at least another apparatus, the at least one processor, with the at least one memory and the computer program code, being configured to cause the apparatus to perform:

receiving, from a user equipment whose position is to be determined, a cell-related timing value, and a terminal-related timing value for timing-based positioning calculation, where the terminal-related timing value is for a mobile terminal that is neighboring to the user equipment, wherein the cell-related timing value comprises an observed time difference of arrival of one or more cells with respect to a reference cell, and the terminal-related timing value comprises at least one delay value relating to at least the neighboring mobile terminal with respect to a cell-originated positioning-related signal or a timing advance value of the neighboring mobile terminal or an observed time difference of arrival of one or more neighboring mobile terminals with respect to the user equipment, and performing timing-based positioning calculation relating to the user equipment whose position is to be determined on the basis of the received cell-related and terminal-related timing values. --

Column 22, line 8-21, insert the following claim:

-- A memory storing computer-executable computer program code which, when run on a computer, is configured to cause a host user equipment to at least:

measure a cell-related timing value for timing-based positioning calculation on the basis of a cell-originated positioning-related signal, the cell-related timing value comprises an observed time difference of arrival of one or more cells with respect to a reference cell, measure a terminal-related timing value for timing-based positioning calculation, wherein the terminal-related timing value is for a neighboring mobile terminal different from the user equipment, the terminal-related timing value comprises at least one delay value relating to at least the neighboring mobile terminal or a timing advance value of at least the neighboring mobile terminal or an observed time difference of arrival of at least the neighboring mobile terminal with respect to the user equipment, and signal the measured cell-related timing value and the measured terminal-related timing value towards a network side for timing-based positioning calculation. --